(12) United States Patent
Sotgiu

(10) Patent No.: US 7,715,024 B2
(45) Date of Patent: *May 11, 2010

(54) METHOD OF AND APPARATUS FOR DETERMINING GEOMETRICAL DIMENSIONS OF A WHEEL RIM, IN PARTICULAR WHEN FITTING AND/OR REMOVING A MOTOR VEHICLE TYRE

(75) Inventor: Paolo Sotgiu, Modena (IT)

(73) Assignee: Snap-On Equipment SRL A. Unico Socio, Correggio (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/979,245

(22) Filed: Oct. 31, 2007

(65) Prior Publication Data

US 2008/0123107 A1 May 29, 2008

(30) Foreign Application Priority Data

Nov. 28, 2006 (EP) .................................. 06024644

(51) Int. Cl.
- G01B 11/14 (2006.01)
- G01B 11/26 (2006.01)
- G01B 11/30 (2006.01)
- G01B 11/24 (2006.01)
- G01C 1/00 (2006.01)

(52) U.S. Cl. ................. 356/614; 356/139.09; 356/601; 356/602; 356/623; 356/625

(58) Field of Classification Search ........................ None
See application file for complete search history.

(56) References Cited

U.S. PATENT DOCUMENTS

| | | | |
|---|---|---|---|
| 3,877,505 A | | 4/1975 | Besuden et al. |
| 6,173,213 B1 * | | 1/2001 | Amiguet et al. ............. 700/230 |
| 6,535,281 B2 | | 3/2003 | Conheady et al. |
| 6,657,711 B1 * | | 12/2003 | Kitagawa et al. ............ 356/155 |
| 6,909,514 B2 * | | 6/2005 | Nayebi ........................ 356/601 |

(Continued)

FOREIGN PATENT DOCUMENTS

DE 25 29 343 B2 1/1977

(Continued)

*Primary Examiner*—Tarifur Chowdhury
*Assistant Examiner*—Gordon J Stock, Jr.
(74) *Attorney, Agent, or Firm*—McDermott Will & Emery LLP

(57) ABSTRACT

An apparatus for and a method of fitting or removing a motor vehicle tyre (4) comprising a rotatably supported wheel receiving device (2) to which the rim (3) is to be fixed, at least one fitting or removal tool (5), a rotary drive device (10) for the wheel receiving device and a sensing device (6), (7), (8) for sensing the radially outer rim contour (12), (14) along which the at least one fitting or removal tool is to be guided during the fitting or removal operation, wherein the sensing device (6), (7), (8) is a sensing device which contact-lessly senses the rim contour and the sensing signals of which are converted into electrical sensing signals, and connected to the sensing device (6), (7), (8) is a control device (9) which evaluates the electrical sensing signals and which controls the at least one fitting or removal tool (5) in the fitting or removal operation in dependence on the sensing signals without contact with the rim surface.

23 Claims, 2 Drawing Sheets

U.S. PATENT DOCUMENTS

| | | | |
|---|---|---|---|
| 7,064,818 B2* | 6/2006 | Braghiroli | 356/139.09 |
| 7,065,444 B2* | 6/2006 | Braghiroli | 701/124 |
| 7,089,987 B2* | 8/2006 | Gonzaga | 157/14 |
| 7,221,441 B2* | 5/2007 | Douglas et al. | 356/139.09 |
| 7,230,694 B2* | 6/2007 | Forster et al. | 356/139.03 |
| 7,269,997 B2* | 9/2007 | Dale et al. | 73/146 |
| 2004/0165180 A1 | 8/2004 | Voeller et al. | |
| 2005/0052657 A1* | 3/2005 | Braghiroli | 356/602 |
| 2005/0052658 A1* | 3/2005 | Braghiroli | 356/602 |
| 2005/0165509 A1* | 7/2005 | Braghiroli | 700/279 |
| 2008/0234960 A1* | 9/2008 | Byington et al. | 702/81 |
| 2008/0297777 A1* | 12/2008 | Sotgiu | 356/139.09 |
| 2009/0033949 A1* | 2/2009 | Braghiroli | 356/635 |
| 2009/0266494 A1* | 10/2009 | Sotgiu | 157/1.24 |

FOREIGN PATENT DOCUMENTS

| | | |
|---|---|---|
| EP | 1 405 690 A1 | 10/2003 |
| EP | 1 479 538 A2 | 5/2004 |
| EP | 1 515 129 | 3/2005 |

* cited by examiner

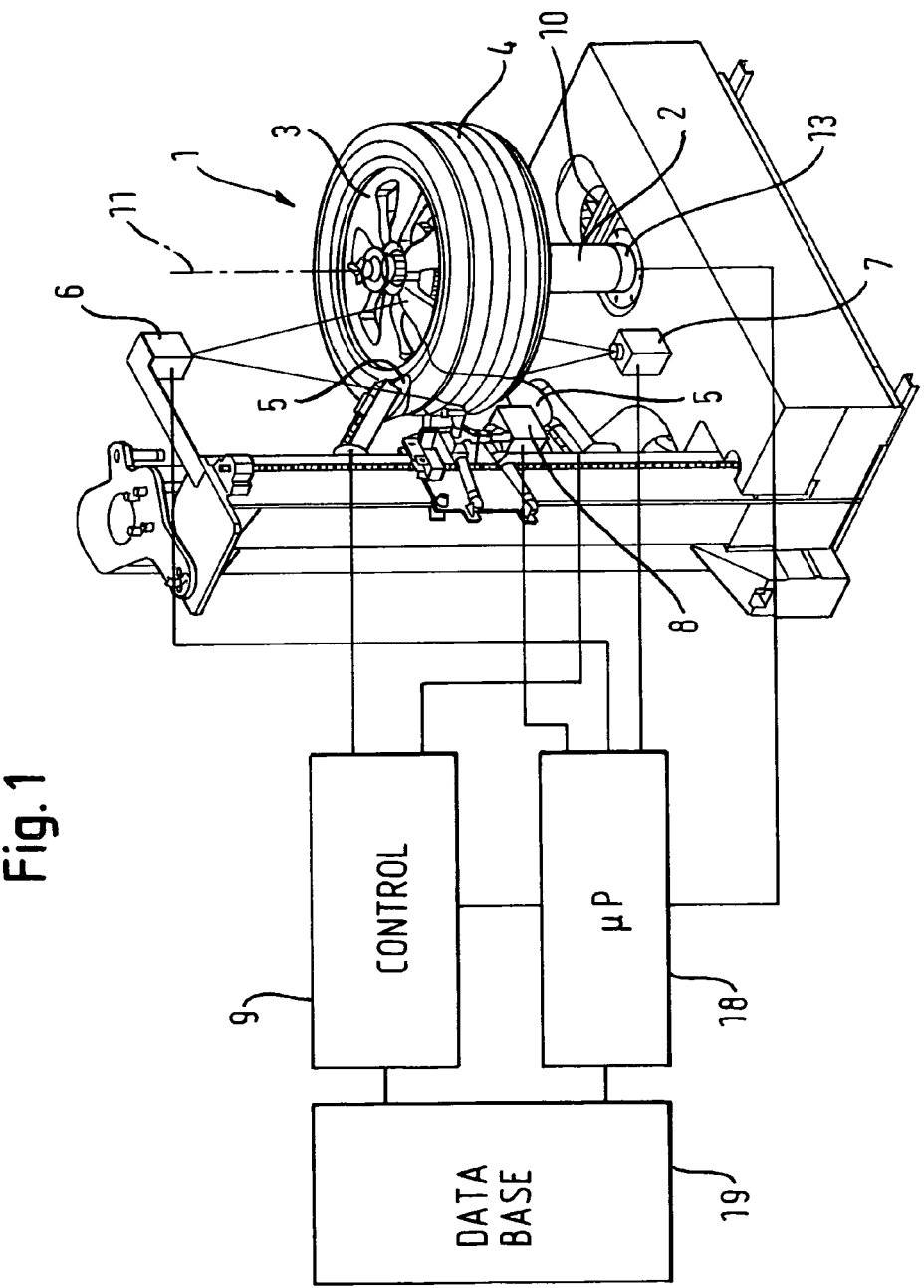

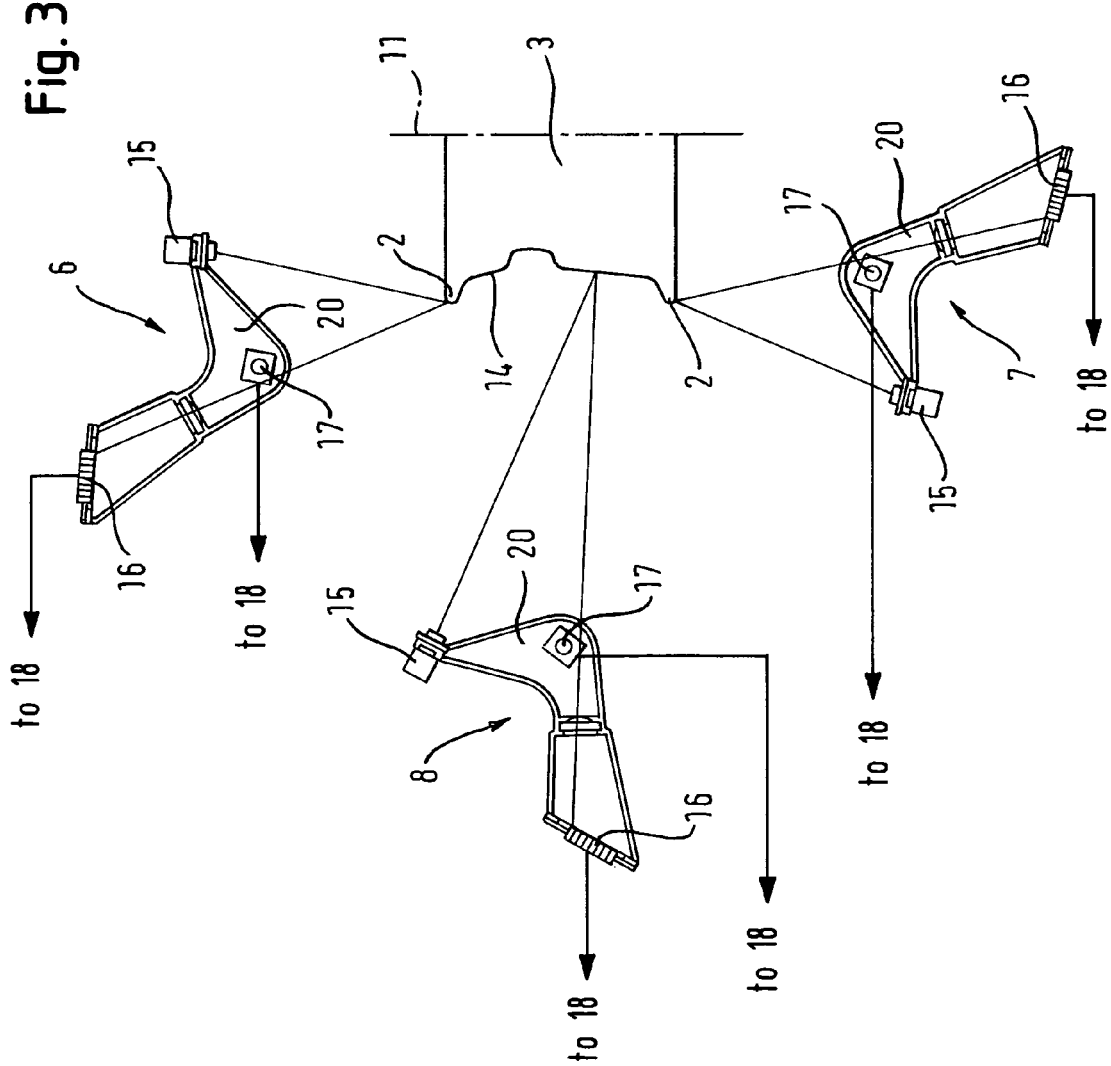

METHOD OF AND APPARATUS FOR DETERMINING GEOMETRICAL DIMENSIONS OF A WHEEL RIM, IN PARTICULAR WHEN FITTING AND/OR REMOVING A MOTOR VEHICLE TYRE

FIELD OF DISCLOSURE

The invention concerns a method of and apparatus for determining geometrical dimensions of a wheel rim, in particular when fitting and/or removing a motor vehicle tyre.

The invention concerns a method of and apparatus for determining geometrical dimensions of a wheel rim, in particular when fitting and/or removing a motor vehicle tyre.

BACKGROUND

An apparatus which is known from U.S. Pat. No. 3,877,505 has a wheel receiving device to which the rim of a motor vehicle wheel can be fixed. The wheel receiving device can be rotated during the fitting or removal operation by means of a rotary drive device, for example an electric motor. The tyre can be fitted to the rim or released the rim by means of fitting or removal tools. Provided on the removal tool is a sensing device in the form of a projection which senses the radial outside surface (rim bed) of the rim and which comprises a material which does not damage the rim material, for example plastic material. That ensures that the removal tool is kept at a given spacing from the surface of the rim in the removal operation. That prevents the rim surface being damaged by the hard material of the removal tool. In that case however there is the danger that the projection which senses the rim contour and which maintains the spacing wears away due to abrasion or is damaged in some other fashion.

An apparatus which is known from U.S. Pat. No. 3,877,505 has a wheel receiving device to which the rim of a motor vehicle wheel can be fixed. The wheel receiving device can be rotated during the fitting or removal operation by means of a rotary drive device, for example an electric motor. The tyre can be fitted to the rim or released from the rim by means of fitting or removal tools. Provided on the removal tool is a sensing device in the form of a projection which senses the radial outside surface (rim bed) of the rim and which comprises a material which does not damage the rim material, for example plastic material. That ensures that the removal tool is kept at a given spacing from the surface of the rim in the removal operation. That prevents the rim surface being damaged by the hard material of the removal tool. In that case however there is the danger that the projection which senses the rim contour and which maintains the spacing wears away due to abrasion or is damaged in some other fashion.

It is also known from DE 25 29 343 B2 for the fitting or removal tool to be moved along a control surface which ensures that the tool is guided on a curved path along the rim contour in the rim bed during the fitting or removal operation. Here too there is the danger that the guidance along the desired curved path is no longer achieved due to abrasion wear at the control surface. The control surface therefore has to be frequently replaced.

The problem of the present invention is to provide an apparatus of the kind set forth in the opening part of this specification, in which the geometrical dimensions of the wheel rim are reliably determined and in particular the fitting or removal tool is guided in such a way as to protect the rim during the fitting or removal operation.

SUMMARY

That problem is solved by the features of claims of the instant application. The appendant claims recite advantageous developments of the invention.

The invention provides that the rim contour is sensed in a contact-less manner, in particular optically. The sensing signals of the sensing device are converted into electrical sensing signals. A suitable transducer device is preferably integrated into the sensing device. The sensing device can comprise a plurality of sensing devices. Preferably sensing is effected at two sides of the rim well-base bed, wherein sensing is effected from the respective rim bead towards the centre of the rim bed. In that situation the rim contour is determined at least in the regions in which the fitting or removal tool is moved during the fitting or removal operation. In known fashion, particularly in the removal operation, it is possible to use two removal tools which engage the two bead regions of the vehicle tyre. The movement of the respective fitting or removal tool is guided in dependence on the sensing signals in such a way that no contact with the surface in the rim bed and at the rim beads occurs. The respective fitting or removal tool is therefore always guided at a given safety spacing from the rim surface.

For contact-less sensing a respective optical sensing device can have a light source which emits a light beam on to the rim surface in one or more given directions. The light beam is reflected from the impingement points at the rim surface and the reflected light beam is detected by a photosensitive detector. The spacings and thus positions of the individual points sensed at the rim can be determined for example by triangulation in dependence on the directions of the emitted light beam and the reflected light beam.

BRIEF DESCRIPTION OF DRAWINGS

The invention will be described in greater detail hereinafter by means of an embodiment by way of example with reference to the Figures in which:

FIG. 1 shows an embodiment of the invention,

FIG. 2 shows a view of a rim half of a motor vehicle wheel with fitting or removal tools which are diagrammatically illustrated in the proximity of the two rim beads, and FIG. 3 shows an embodiment of an optical sensing device.

DETAILED DESCRIPTION

The illustrated embodiment includes a wheel receiving means 2 to which a rim 3 of a motor vehicle wheel 1 can be fixed. The wheel receiving means can have as illustrated a receiving bar, a wheel plate on which the rim is placed, or clamping arms on which the rim is supported, or another support arrangement. The rim 3 is non-rotatably connected to the wheel receiving means 2 by fixing means, in particular clamping means.

The illustrated embodiment also includes fitting or removal tools 5 which are diagrammatically illustrated and which, when the motor vehicle wheel 1 is arranged horizontally, are caused to come into contact from below and from above in the proximity of the tyre beads which, when the motor vehicle tyre 4 is in the fitted condition, lie behind the two lateral rim beads 12 of the rim 3.

The wheel receiving means 2 is caused to rotate by means of a rotary drive device 10 which can be in the form of an electric motor. The rotary drive takes place about a wheel axis 11.

Provided at both sides of the rim 3 or in the illustrated embodiment at the top side of the rim and at the underside of the rim are sensing devices 6 and 7 with which it is possible to implement contact-less and in particular optical sensing of the rim beads 12 at the radial outer surface (rim bed 14) of the rim 3. The contour of the rim bed is shown in FIG. 2.

Contact-less and in particular optical sensing with the sensing devices 6 and 7 which are arranged laterally of the rim 3 is effected essentially for sensing the rim contour in the region of the rim beads 12. In the tyre removal operation, when the motor vehicle wheel is rotated about the wheel axis 11 through at least 360°, the shapes and the spatial positionings of the rim beads 12 with respect to a reference which is fixed in relation to the machine, for example with respect to the axis of rotation about which the wheel receiving means 2 is rotated and which coincides with the wheel axis 11, are determined in a horizontal plane. In addition the outside diameters of the two rim beads 12, in particular the position of the outer peripheries of the two rim beads 12 with respect to the reference which is fixed in relation to the machine, can be determined. It is also possible in that case to determine rotary angle-related heightwise and lateral run-out of the rim beads 12. A rotary angle sender 13 can be provided at the drive device 10 or at the wheel receiving means 2, for ascertaining the respective rotary angles. The corresponding rotary angle signals are sent to an evaluation arrangement 18 to which the electrical sensing signals from the sensing devices 6 and 7 are also sent. That evaluation arrangement 18 evaluates the sensing signals and the rotary angle signals with computer aid and, as already explained, ascertains the spatial positioning preferably of the outer peripheries and possibly also the shapes of the rim beads 12 with respect to the reference which is fixed in relation to the machine, in particular the axis of rotation of the wheel receiving means 2, which is coincident with the wheel axis 11. In addition referencing is effected with respect to at least one horizontal plane that is fixed in relation to the machine, so that the spatial position of the rim beads 12 with respect to the machine frame and thus with respect to the fitting or removal tools 5 which are guided on the machine frame is determined.

At the beginning of the removal operation the tyre beads are released from the rim beads 12 and pushed into the interior of the rim bed. In order to ensure that the removal tools 5 engage the tyre in the hard region of the tyre beads, control of the movements of the removal tools 5 is effected in dependence on the position of the rim bead peripheries and the respective rim bed profile. For that purpose, a control device 9 is connected to the evaluation arrangement 18 and to a store 19, for example in the form of a database, in which, for various types of wheels, the contours of the rim beds 14, that is to say the contours between the respective rim beads 12, are stored. As the spatial positioning of the two rim beads 12 or at least one of the two rim beads 12 with respect to the machine frame is already determined by virtue of optical sensing and evaluation of the sensing signals, the spatial position of the rim bed 14 which is between the two rim beads 12 and thus the position of the rim bed contour between the two rim beads 12 is also known. Accordingly, further positioning of the removal tools 5 is effected along given curved paths at a spacing from the surface of the rim bed 14. The control device 9 includes driver stages which are suitably designed for that purpose, for the movements of the fitting and removal tools.

Advantageously, the sensing devices 6, 7 and 8 are disposed in front of the fitting or removal tools 5, in the direction of rotation of the motor vehicle wheel 1. It is then not necessary firstly to effect sensing at the rim 3 over the entire periphery of the wheel (360°), but the controlled movement of the fitting or removal tools 5 can be effected immediately after sensing of the respective rim regions when those sensed rim regions come into the region for access of the fitting or removal tools 5 in the rotary movement of the wheel.

A third sensing device 8 can be provided for sensing the wheel rim 3, in particular for sensing the rim bed 14. The sensing direction of that sensing device 8 is oriented substantially in a horizontal direction, wherein the overall width of the rim bed 14 between the two rim beads 12 and the outer peripheral edges of the rim beads 12 is determined so that the contour of the rim bed 14 is ascertained. That contour can also be detected in rotary angle-related relationship as at the same time the respective rotary angles are detected by means of the rotary angle sender 13 and corresponding electrical rotary angle signals are fed to the control device 9. The sensing device 8 which is preferably an optically sensing device sends electrical sensing signals to the control device 9. The contour of the rim bed can be detected in rotary angle-related relationship in that way prior to the tyre fitting operation. In addition the outer peripheral edges of the rim beads 12 and the regions, which are adjacent to the rim bed, of the rim beads 12 can also be sensed. As the position of the sensing device 8 is established in the same manner as the positions of the sensing devices 6 and 7 on the machine frame and are thus known, the spatial positioning of the rim bed and the rim beads 12 can be determined in particular by the optical measurement of the spacing involved, for example using a triangulation method. When fitting the motor vehicle tyre 4 to the rim 3 the fitting tools 5 can then be controlled in their movement in such a way that no contact occurs with the rim surface, in particular in the region of the rim beads 12 and in the region of the rim bed.

The tyre profile can also be optically sensed with the sensing device 8 when the tyre 4 is mounted on the rim 3.

The spatial positions of the respective sensed points can be ascertained by spacing measurement, in particular using a triangulation method. Sensing devices which are suitable for that purpose are known from U.S. Pat. No. 6,535,281 and EP 1 515 129 A1, in terms of detecting geometrical data of motor vehicle wheels. With the device shown in FIG. 3, it is possible for the dimensions of the rim 3 to be determined also in regard to heightwise and lateral run-out.

As shown in FIG. 3, each sensing device 6, 7 and 8 can have a light source 15, in particular a laser beam source, which are mounted with a photosensitive sensor 16, for example a CCD sensor, on a common carrier 20, about respective common axes 17. The axes 17 are arranged fixedly with respect to the machine and can form the machine-related position references for the points which are sensed on the rim 3. The light beams emitted by the respective light sources impinge on the surface of the rim 3 and are reflected there. The reflected beam is passed on to the sensor 16 by way of an optical receiver system. The impingement point at the sensor 16 is proportional to the directions of the light beam which is emitted by the light source 16 and the reflected light beam and thus to the spacing of the impingement point at which the sensing light beam impinges on the rim surface. As the respective pivotal angle of the light source 15 and the sensor 16 about the axis 17 is detected and corresponding angle signals are passed to the computer-aided evaluation arrangement 18, the spacing of the impingement point and its spatial position on the machine frame can be determined by means of the known triangulation method. The respective sensing signals of the sensors 16 are passed to the evaluation arrangement, as already described hereinbefore. Evaluation of the signals in the evaluation arrangement 18 is effected by means of an electronic computer. The respective rotary angle position of the rim 3 is determined by the rotary angle sender 13 which is connected to the evaluation arrangement 18.

LIST OF REFERENCES 1 motor vehicle wheel
2 wheel receiving device
3 rim
4 motor vehicle tyre
5 fitting or removal tool
6 sensing device
7 sensing device
8 sensing device
9 control device
10 rotary drive device
11 wheel axle
12 rim beads
13 rotary angle sender
14 rim bed
15 light source (laser beam source)
16 detector
17 pivot axis
18 evaluation arrangement
19 store (database)
20 carrier

The invention claimed is:

1. A method of determining geometrical dimensions of a rim of a motor vehicle wheel by contact-less sensing,
wherein a light beam is emitted onto the rim or least part of the rim and a light beam reflected at an impingement point is detected and that the directions of the emitted and reflected light beams are evaluated for determining the position of the respective impingement spot on the rim, and
wherein a rim contour along which at least one fitting or removal tool is guided during a fitting or removal of a motor vehicle tyre is contactlessly sensed and a movement of the fitting or removal tool is guided in dependence on the sensed contour without contact with a rim surface.

2. A method according to claim 1, wherein a movement of the at least one fitting or removal tool is controlled in dependence on a sensed position of at least one of two rim beads and in dependence on a stored or sensed contour of a rim bed.

3. A method according to claim 1, wherein a movement of the at least one fitting or removal tool is controlled in dependence on a detected position of an outer peripheral edge of at least one of two rim beads.

4. A method according to claim 1, wherein the emitted light beam is directed onto the rim which rotates about a stationary axis.

5. A method according to claim 1 or claim 4, wherein the light beam is emitted onto the rim from one or more given positions.

6. A method according to one of claims 1 to 4, wherein at least one annular surface around a rim axis is sensed on the rim with the emitted light beam.

7. A method according to one of claims 1 to 4, wherein at least one of two rim beads is sensed with the emitted light beam.

8. A method according to one of claims 1 to 4, wherein an outer peripheral surface of the rim is sensed with the emitted light beam.

9. A method according to one of claims 1 to 4, wherein a spacings of respective rim parts which are sensed with the light beam relative to a stationary reference are ascertained.

10. A method according to claim 9, wherein the operation of sensing spacings is effected in accordance with a triangulation method.

11. An apparatus that determines geometrical dimensions of a rim of a motor vehicle wheel, the apparatus comprising:
a plurality of sensing devices for sensing a rim surface, and
a computer-aided evaluation arrangement device for evaluation of electrical sensing signals supplied by the plurality of sensing devices,
wherein each of the plurality of sensing devices has at least one light source which emits a light beam from at least one given position in at least one given direction onto the rim surface, and a detector which detects a direction of a light beam reflected by the rim surface, and
wherein the evaluation arrangement device is configured to determine the position of an impingement spot sensed by the light beam on the rim surface, from the directions of the emitted light beam and the reflected light beam,
the apparatus further comprising:
a rotatably supported wheel receiving device to which the rim is to be fixed,
at least one fitting or removal tool,
a rotary drive device for the wheel receiving device, and
a control device connected to the evaluation arrangement device,
wherein each of the plurality of sensing devices is configured to contactlessly sense a radially outer rim contour along which the at least one fitting or removal tool is to be guided during a fitting or removal of a motor vehicle tyre, and
the control device is configured to control the at least one fitting or removal tool in the fitting or removal operation based on the sensing signals without contact with the rim surface.

12. An apparatus according to claim 11, wherein each of the plurality of sensing devices is an optical sensing device.

13. An apparatus according to claim 11, wherein at least one of the plurality of sensing devices is arranged in front of the at least one fitting or removal tool in the direction of rotation of the wheel receiving device.

14. An apparatus according to claim 11, wherein a spatial position of the respectively sensed point on the rim is determined with respect to at least one fitting or removal tool.

15. An apparatus according to claim 11, wherein respective spatial positions of outer peripheral edges of rim beads are determined.

16. An apparatus according to claim 11, wherein the evaluation arrangement device is suitable for determining spatial position of rim bed which is between rim beads.

17. An apparatus according to claim 11, wherein, for different wheel types, contours of rim beds are stored in a store of the control device or in a store connected to the control device.

18. An apparatus according to claim 11, wherein two of the plurality of sensing devices each having the light source and the detector are provided for sensing two rim beads.

19. An apparatus according to claim 17, wherein contours of rim beads are additionally stored in the store of the control device.

20. An apparatus according to one of claims 11 and 18, wherein one of the plurality of sensing devices includes a light source and an associated detector for sensing a rim outside surface.

21. An apparatus according to one of claims 11 and 18, wherein the light source and the detector of each of the plurality of sensing devices are pivotable synchronously about a common axis and an electrical signal proportional to a respective pivot angle is fed to the evaluation arrangement device.

22. An apparatus according to one of claims 11 or 18, wherein the evaluation arrangement device is suitable for determining the position of a respective location which is sensed on the rim surface from the directions of the light beam emitted by the light source of each of the plurality of sensing devices and the light beam reflected at the rim surface by means of triangulation.

23. An apparatus according to one of claims 11 and 18, wherein a rotary angle sender detects a respective rotary angle position of the rim and supplies a corresponding electrical signal to the evaluation arrangement device.

* * * * *